2,884,699
BORE CONCENTRICITY GAUGE HOLDER

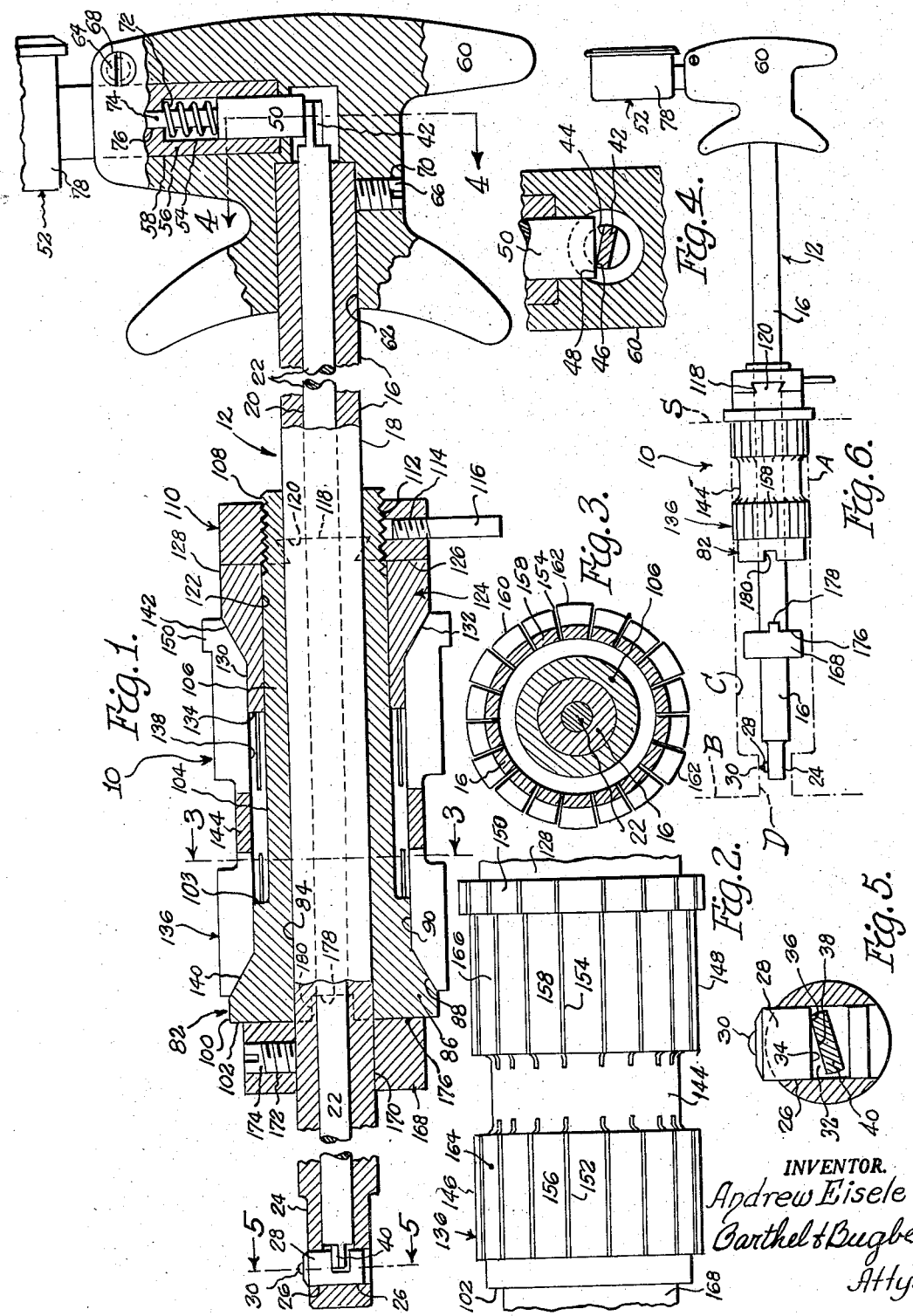

Andrew Eisele, Detroit, Mich.

Application October 27, 1955, Serial No. 543,073

2 Claims. (Cl. 33—178)

This invention relates to bore gauges and, in particular, to bore concentricity gauges.

One object of this invention is to provide a bore concentricity gauge holder wherein the gauge stem is maintained accurately coaxial within a first or reference bore while it is used to explore and measure the departure from concentricity, if any, of a second bore, as well as to gauge the straightness of the second bore, regardless of whether the first or reference bore has an accurately cylindrical, slightly tapered or slightly out of round surface.

Another object is to provide a bore concentricity gauge holder of the foregoing character which positively yet accurately clamps the holder centrally within the reference bore while permitting rotation and also axial sliding of the stem within the holder along an axis which is coincident with the axis of the reference bore, thereby facilitating accurate exploration of all parts of the bore to be gauged.

Another object is to provide a bore concentricity gauge holder of the foregoing character which enables rapid insertion and adjustment of the holder to successive reference bores which vary slightly in diameter or depart slightly from cylindricity, as by being either slightly tapered or slightly out of round while still within permissible manufacturing variations or tolerances, and also enabling rapid releasing and removal therefrom, thereby facilitating the rapid yet accurate gauging of coaxial bores of different diameters under mass production conditions at a low cost of inspection.

Another object is to provide a bore concentricity gauge holder of the foregoing character which avoids the use of expanding balls for contacting the reference bore, thereby avoiding the indentation of the metal and the consequent misleading readings of the gauge, instead employing expanding fingers which engage the surface of the bore over a considerable area and thereby distribute the load or pressure of the gauge holder within the reference bore.

Another object is to provide a bore concentricity gauge holder as set forth in the object immediately preceding, wherein the fingers of each set are permanently and integrally interconnected so as to be incapable of lost motion or undesired shifting, and consequently reducing the chance of error from that source.

Other objects and advantages of the invention will become apparent during the course of the following description of the accompanying drawing, wherein:

Figure 1 is a central vertical section, partly in side elevation, through a bore concentricity gauge holder, according to one form of the invention, with its accompanying gauge and a portion of the so-called dial indicator which indicates the departures from concentricity, straightness or cylindricity of the bore being gauged;

Figure 2 is an enlarged top plan view of the central portion of Figure 1, showing details of the expansible tubular bore-engaging member which engages the reference bore;

Figure 3 is a cross-section taken along the line 3—3 in Figure 1, showing the arrangement of the fingers of the expansible bore-engaging member;

Figure 4 is a cross-section taken along the line 4—4 in Figure 1, showing the connections between the motion-transmitting rod and the plunger of the dial indicator;

Figure 5 is a cross-section taken along the line 5—5 in Figure 1, showing details of the measuring plunger; and Figure 6 is a side elevation on a reduced scale of the bore concentricity gauge holder in use while holding a bore concentricity gauge being employed in checking the concentricity of a second bore from a reference bore.

Hitherto, the checking of the concentricity of a bore to be gauged relatively to a reference bore has been difficult to carry out under mass production conditions, such as, for example, in the mass production of automobile engines. Frequently, two intendedly coaxial bores are used in a machine being manufactured, for example, the longitudinally-spaced coaxial bores of different diameters in an internal combustion engine cylinder block which receive the distributor assembly and its drive shaft. As a result of variations in manufacture, these bores frequently are not only not coaxial but are occasionally not even cylindrical, either as regards their being out of round or tapered. When such conditions are superimposed upon the variations in diameter which must be permitted, within allowable tolerances, in order to make mass production possible, the problem of quickly yet accurately gauging the concentricity or coaxiality of such bores has hitherto been a very serious and seemingly insurmountable problem.

The present invention solves the problem of rapid yet accurate measurement of the concentricity and straightness of a bore to be gauged relatively to a reference bore, even though the reference bore itself may be slightly out of round or slightly tapered or, if accurately cylindrical, slightly varying in diameter within the permissible manufacturing tolerances. The present invention provides a bore concentricity gauge holder which rotatably and slidably receives the elongated cylindrical stem of the bore gauge in a snug accurate fit while adjustably yet fixedly clamping itself in the reference bore in a position wherein the bore gauge stem is accurately coaxial with the reference bore, not withstanding minor variations in the diameter or cylindricity of the reference bore. Moreover, the holder of the present invention is quickly clamped and unclamped or released, so that the minimum time is consumed in placing the instrument in position before gauging, and in removing the instrument from position after gauging, and transferring the instrument to the next bore for the next gauging operation.

Finally, the bore concentricity gauge holder, by being provided with multiple radially expansible fingers, engages the reference bore over a considerable area so as to distribute the pressure over such an area rather than concentrating it in points, as where multiple balls are used to contact the bore walls, thereby avoiding the indentation of the wall and the consequent inaccuracy of gauge readings occasioned thereby.

Referring to the drawing in detail, Figure 1 shows a bore concentricity gauge holder, generally designated 10, holding a bore concentricity gauge, generally designated 12, the latter being conventional, with its details beyond the scope of the present invention. For purposes of illustration, one type of bore gauge 12 has been shown as involving one form of motion-transmitting mechanism, but it will be understood that other forms of such mechanism may be used, for example, those shown in the Eisele Patents No. 2,268,579 of January 6, 1942, No. 2,438,274 of March 23, 1948, No. 2,484,697 of October 11, 1949, No. 2,566,321 of September 4, 1951 or No. 2,581,473 of January 8, 1952.

The bore gauge 12 has an elongated hollow cylindrical stem 16 having an accurately cylindrical outer surface 18 with a longitudinal bore 20 coaxial therewith and rotatably receiving a rotary motion-transmitting rod 22. The stem 16 at its forward end is provided with a reduced diameter portion 24 having an accurately transverse bore 26 containing a reciprocably movable measuring pin 28 snugly but reciprocably mounted herein. The pin 28 is preferably provided with a hemispherical contact tip 30 of exceedingly hard wear-resisting material such as a sapphire, diamond or tungsten carbide insert. The reduced diameter stem portion 24 is of only slightly less diameter than the diameter of the bore to be gauged because the bore gauge 12 is intended to be used under mass inspection conditions on parts of like construction but involving slight departures from the standard measurements, as inevitably arise under manufacturing conditions. Accordingly, under such mass-production conditions a fixed measuring pin at the opposite end of the transverse bore 26 is unnecessary or merely optional if the bores to be gauged are of substantially the same diameters and the reduced diameter portion 24 can accordingly be made of almost that diameter.

The movable measuring pin 28 is provided on one side thereof with a radial notch 32 (Figure 5) having an accurately flat machined side wall surface 34 on the side thereof nearest the contact tip 30. Disposed within the notch 32 and engageable with the contact surface 34 is the sharp edge 36 of a flattened end portion 38 formed on the chord of the circle constituting the circumference of the motion-transmitting rod 22 and forming one side of a diametral end portion 40 of the motion-transmitting rod 22. Accordingly, the engagement of the tip 30 with a bore surface pushes the measuring pin 28 into the transverse bore 26, this reciprocating motion being converted into rotary motion of the motion-transmitting rod 22 by engagement of the side wall surface 34 of the notch 32 with the sharp edge 36 on the flat surface 38 of the diametral end portion 40 of the rod 22.

The opposite end of the motion-transmitting rod 22 is cut away on both sides in a similar manner to provide a diametral portion 42 (Figure 4) similar to the diametral portion 40 and having a similar flat surface 44 with a similar sharp edge 46 engageable with the accurately-machined flat outer end 48 of the reciprocable motion-transmitting plunger 50 of a conventional dial indicator, generally designated 52. The dial indicator plunger 50 is reciprocably mounted within a bore 54 in a tubular stem 56 of hollow cylindrical shape seated in a transverse cylindrical socket 58 in a gauge handle, generally designated 60. The gauge handle 60 has a longitudinal cylindrical socket 62 in which the outer end of the bore gauge stem 16 is snugly seated. Set screws 64 and 66 threaded into transverse bores 68 and 70 respectively serve to lock the dial indicator stem 56 and the bore gauge stem 16 in their respective sockets 58 and 62. The dial indicator plunger 50 is urged downwardly by a helical compression spring 72 mounted within the upper part of the bore 54 and encircling the reduced diameter upper portion 74 of the dial indicator plunger 50, thereby tending to rotate the motion-transmitting rod 22 in a counterclockwise direction (Figure 4).

The reduced diameter upper portion 74 of the dial indicator plunger 50 passes through a corresponding reduced diameter bore 76 in the stem 56, thence into the interior of the casing 78 of the dial indicator 52, where it engages conventional motion-multiplying mechanism (not shown) whereby the reciprocating motion of the dial indicator plunger 50 is converted into rotary motion of the usual dial indicator needle shaft and needle (not shown) with which the dial indicator 52 is normally equipped. This dial indicator needle registers with the usual circumferentially-divided scale indicating the amount of motion of the measuring pin 28 in any suitable unit, such as in ten-thousandths of an inch. The details of the dial indicator 52 are conventional and are consequently outside the scope of the present invention, such dial indicators being available on the open market. For the convenience of the inspector, so as to enable him to read the dial indicator 52 most conveniently when the bore gauge 12 is used in a horizontal position, the casing 78 of the dial indicator 52 is mounted transversely to the axis of the bore gauge stem 16, so that its face 80 lies in a plane perpendicular to the axis of the motion-transmitting rod 22.

The bore concentricity gauge holder 10 includes an inner sleeve 82 (Figure 1) having a central longitudinal bore 84 therethrough which snugly yet slidably receives the outer cylindrical surface 18 of the bore gauge stem 16. One end of the inner sleeve 82 is provided with an integral fixed expanding conical portion 86 forming an enlargement thereon and having a conical surface 88 extending from an intermediate cylindrical surface 90 to an outer cylindrical surface 100 which in turn extends to the end wall 102 of the inner sleeve 82. The intermediate cylindrical surface 90 in turn is joined by an annular shoulder 103 to a reduced diameter inner cylindrical surface 104 on a reduced diameter sleeve portion 106 which extends the remainder of the length of the inner sleeve 82 and is threaded as at 108 at its end opposite the enlargement 86.

Threaded upon the threaded end portion 108 is a rotary nut 110 having an internally-threaded bore 112 threadedly engaging the threaded portion 108 (Figure 1) and also having a transverse threaded hole 114 receiving the threaded end of a handle pin 116. The body of the nut 110 is provided with a transverse dovetail slot 118 (Figures 1 and 6) which is of course discontinuous across the threaded bore 112. The dovetail slot 118 receives the correspondingly-shaped dovetail tongue 120 also discontinuous on opposite sides of a central bore 122 in an axially movable expanding cone, generally designated 124, from the outer end 126 of which the tongue 120 extends outward. The nut 110 is thus provided with a driving connection with the movable expanding cone 124, so that when the nut 110 is rotated and travels lengthwise along the threaded portion 108, it pulls or pushes the movable cone 124 along with it. The nut 110 and cone 124 must, of course, be assembled by sliding the tongue transversely into the dovetail slot 118 before attempting to move the cone 124 onto the reduced diameter portion 106 of the inner sleeve 82 and engage the threads of the nut 110 with the threaded portion 108 thereof.

The movable expanding cone 124 is provided with an outer cylindrical surface 128 and an inner cylindrical surface 130 joined to one another by a conical surface 132, the inner cylindrical surface 130 being preferably of the same diameter as the inner cylindrical surface 90 of the fixed expanding cone 86. The two conical surfaces 88 and 132 thus taper toward one another and the inner end 134 of the movable cone 124 faces the shoulder 103 at the end of the enlargement 86 on the inner sleeve 82 forming the fixed expanding cone 86. Slidably and rotatably mounted on the inner sleeve 82 is an outer expansible sleeve, generally designated 136, containing a central longitudinal bore 138 and outwardly-flared conical end bores 140 and 142 respectively engageable with the conical surfaces 88 and 132 and having the same taper so that they mate with one another.

The outer expansible sleeve 136 has a reduced diameter solid annular central portion or connecting portion 144 and opposite end portions 146 and 148 (Figure 2) of enlarged diameter, the end portion 148 being additionally provided with an end flange 150. The end portions 146 and 148, including the flange 150, are provided with circumferentially-spaced multiple slots 152 and 154 respectively, aligned axially with one another and dividing the respective end portions 146 and 148 into multiple fingers 156 and 158 of approximately the same diameters. The majority of these fingers have external surfaces 160 (Figure 3) but certain of them have larger diameter outer surfaces 162, causing them to extend radially farther outward from the axis thereof.

The enlarged fingers 164 and 166, six being shown for purposes of illustration, are spaced circumferentially apart from one another and engage the reference bore at circumferentially-spaced locations. Mounted on the stem 16 of the bore concentricity gauge 12 between the bore concentricity gauge holder 10 and the reduced diameter portion 24 of the stem 16 is an abutment collar 168 having a bore 170 snugly but slidably receiving the outer surface 18 of the stem 16 and having a threaded transverse bore 172 threadedly receiving a set screw 174 threaded therein for locking the collar 168 to the stem 16. One end 176 of the collar 168 is engaged by the end 102 of the inner sleeve 82. The abutment collar 168 is provided with a diametrically-extending tongue 178 (Figure 6) engaging a correspondingly-shaped diametrical groove 180 extending across the enlargement 86 of the inner sleeve 82 at the end 102 thereof, thereby providing an interlocking connection therebetween.

In the operation of the invention, let it be assumed that intendedly coaxial bores A and D in a body B such as an internal combustion engine cylinder block are to be checked by the bore concentricity gauge 12 while it is held by the bore concentricity gauge holder 10 in the bore A, which is the reference bore. The bores A and D may, if desired, have a non-precision relief bore C between them, or the bore A may extend continuously down to its shoulder connection with the bore D to be checked. A common example of such a set of bores to be checked for concentricity and alignment are the distributor hole and shaft hole in an internal combustion engine block.

To check the bore D for concentricity with the reference bore A (Figure 6), the user inserts the holder 10 containing the bore concentricity gauge 12 in the reference bore A of the body B until the shoulder or flange 150 comes to a halt against the surface S of the body B surrounding the reference bore A. It is of course assumed that the fixed and movable expanding cones 86 and 124 have been moved far enough apart from one another to permit the fingers 164 and 166 to spring radially inward a sufficient distance to permit the easy insertion of the outer sleeve 136 into a reference bore A which has the minimum diameter permissible under existing manufacturing tolerances.

The operator now expands the bore concentricity gauge holder 10 in the reference bore A while the reduced diameter end portion 24 and its movable measuring pin 28 are retracted into the bore C. The operator does this by rotating the nut 110 by means of its handle 116 while holding the inner sleeve 82 in locked engagement with the abutment collar 168 by means of the tongue and groove connection 178, 180 therebetween (Figure 6). Under these circumstances the handle 60 can be used to hold the bore concentricity gauge 12 against rotation while swinging the handle 116 to rotate the nut 110. Because of the driving connection formed by the dovetail tongue 120 and dovetail groove 118, the movable expanding cone 124 rotates with the nut 110 as it threads its way along the threaded portion 108 of the reduced diameter portion 106 of the inner sleeve 82. The engagement of the internal conical surface 140 and 142 with the external conical surfaces 88 and 132 expands the fingers 164 and 166 and likewise the fingers 156 and 158, the fingers 164 and 166 of larger diameter engaging the reference bore A. When a sufficient expansion has been obtained in this manner so as to firmly seat the bore concentricity gauge holder 10 in the reference bore A, the operator ceases rotation of the nut 110. The bore 84 in the inner sleeve 82 and the bore gauge stem 16 mounted therein are now located accurately concentric or coaxial with the reference bore A regardless of whether the bore A is axactly cylindrical or slightly tapered.

To check the bore D for concentricity relatively to the reference bore A, and also, if desired, for straightness, the inspector grasps the handle 60 and pushes the stem 16 inward until the measuring tip 30 of the movable measuring pin 28 and the reduced diameter portion 24 in which it is mounted enter the bore D to be checked. As the contact tip 30 engages the wall of the bore D, the needle of the dial indicator gauge 52 remains at zero if the bore D is accurately concentric with the bore A while the bore gauge 12 is rotated a complete revolution, whereby the contact tip 30 of the measuring pin 26 explores the entire circumference of the bore D. If, however, there is a departure from concentricity, the needle of the dial indicator 52 moves during such rotation and indicates the extent of such departure from concentricity on its scale. To check the straightness of the bore D relatively to the bore A, the inspector pushes the reduced diameter portion 24 and contact tip 30 of the measuring pin 28 straight into the bore D without rotating the stem 16. If the bore D is straight, the needle of the dial indicator 52 will remain motionless during this pushing operation. If, however, the bore D is angled or tilted relatively to the bore A, the needle of the dial indicator 52 will move as the contact tip 30 of the movable measuring pin 28 travels from one end to the other end of the bore D, the extent of swing of the dial indicator needle indicating the amount of tilt and any departure from straightness of the bore D.

To loosen the bore concentricity gauge holder 10 in order to withdraw the assembly from the holes being checked and insert it in a new set of holes A and D, the inspector while grasping the bore gauge handle 60 in one hand pulls the gauge stem 16 outward, at the same time rotating it until he feels the tongue 178 of the fixed collar 168 enter the notch 180 in the end of the fixed sleeve or inner sleeve 82, thereby locking these two sleeve or inner sleeve 82 momentarily together. When he now holds the stem 16 and inner sleeve 82 stationary by means of the handle 60, he rotates the nut 110 by means of the handle 116, and correspondingly rotates the movable cone 124 by its tongue and groove connection 118, 120 therewith, separating the oppositely-tapered conical surfaces 88 and 132 and permitting the spring fingers 156, 158 and 164, 166 to spring radially inward. The operator can then withdraw the assembly of the gauge holder 10 and gauge 12 from the hole A and place it in another set of holes to be inspected.

While the gauge holder 10 of the present invention has been described in connection with its use for holding bore concentricity gauges, it can also be used for holding gauges of other types, such as plug gauges inserted and held in the bore 84. It will also be understood that the holder 10 itself may be used for checking the bore in which it is inserted.

What I claim is:

1. An expansible bore gauge stem holder for centering and holding a bore gauge stem in an aperture, comprising a tubular body member having a bore adapted to receive said stem and having an externally-tapered surface thereon, a sleeve having a bore telescopingly receiving said body member and having near one end thereof an internally-tapered surface matingly engageable with said externally-tapered surface, said sleeve having circumferentially-spaced axially-directed multiple slots therethrough extending axially inward from the end thereof having said internally-tapered surface, said slots defining circumferentially-spaced axially-extending multiple fingers collectively forming a finger assembly engageable with the wall of the aperture, means disposed between said body member and sleeve for moving said body member and sleeve in an axial direction relatively to one another whereby to expand and contract said finger assembly in a radial direction within the aperture, an abutment member with a stem-receiving opening therethrough adapted to be secured to the stem, and disengageable interlocking means disposed between said body member and said abutment member and including an axial projection on one of said members and an axial recess on the other of said members snugly receiving said projection for selectively locking together said body member and abutment member against relative rotation therebetween.

2. An expansible bore gauge stem holder for centering and holding a bore gauge stem in an aperture, comprising a tubular body member having a bore adapted to receive said stem and having an externally-tapered surface thereon, a sleeve having a bore telescopingly receiving said body member and having near one end thereof an internally-tapered surface matingly engageable with said externally-tapered surface, said sleeve having circumferentially-spaced axially-directed multiple slots therethrough extending axially inward from the end thereof having said internally-tapered surface, said slots defining circumferentially-spaced axially-extending multiple fingers collectively forming a finger assembly engageable with the wall of the aperture, and means including a threaded portion on said body and a rotary threaded nut threaded onto said threaded portion for moving said body member and sleeve in an axial direction relatively to one another whereby to expand and contract said finger assembly in a radial direction within the aperture, said body member moving means including two laterally-displaceable parts, one part having a radial dovetail groove thereacross and the other part having a radial dovetail rib matingly engaging said groove.

References Cited in the file of this patent

UNITED STATES PATENTS

| | | |
|---|---|---|
| 30,616 | Colton | Nov. 13, 1860 |
| 1,329,456 | Carpenter | Feb. 3, 1920 |
| 1,468,270 | Kent | Sept. 18, 1923 |
| 1,633,807 | Darlington | June 28, 1927 |
| 1,959,891 | Zimmerman | May 22, 1934 |
| 2,174,076 | Bowen | Sept. 26, 1939 |
| 2,203,806 | Wolf | June 11, 1940 |
| 2,355,316 | Mestas | Aug. 8, 1944 |
| 2,775,025 | Williams | Dec. 25, 1956 |

FOREIGN PATENTS

| | | |
|---|---|---|
| 224,234 | Switzerland | June 1, 1943 |
| 121,053 | Sweden | Mar. 2, 1948 |
| 1,024,244 | France | Jan. 7, 1953 |